Patented Aug. 20, 1940

2,212,141

UNITED STATES PATENT OFFICE 2,212,141

ESTERS AND THEIR PREPARATION

Van Vernon Alderman, Arden, and Merlin Martin Brubaker and William Edward Hanford, Wilmington, Del., assignors to E. I. du Pont de Nemours & Company, Wilmington, Del., a corporation of Delaware No Drawing. Application April 11, 1939,
Serial No. 267,336

14 Claims. (Cl. 260—455)

This invention relates to esters and their preparation and more particularly to esters of hydroxythiols.

This invention has as an object the provision of a new process for the preparation of esters of hydroxythiols. A further object comprises certain new classes of esters thus produced. Other objects will appear hereinafter.

These objects are accomplished by the following invention wherein an ethylene sulfide is reacted with an interanhydride of an organic carboxylic acid.

The term "ethylene sulfide" or the term "α-alkylene sulfide" designates a compound containing the grouping

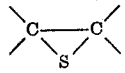

The term "interanhydride" designates a compound derived or to be regarded as derived either by intermolecular abstraction of the elements of water from the functional groups of two compounds, at least one of which is a carboxylic acid, the other being either a carboxylic acid or a hydrohalogen acid, or by intramolecular abstraction of the elements of water from the carboxyl groups of a dicarboxylic acid. Thus the interanhydride is to be regarded as derived by abstraction of the elements of water from two acidic groups, a carboxyl group furnishing a hydroxyl of the water, the remaining proton being the acidic hydrogen, either of another carboxyl group or a hydrohalogen acid.

In the process of the present invention an olefin sulfide exemplified by ethylene sulfide is reacted with an intermolecular anhydride of an organic carboxylic acid with or without the assistance of an inert solvent for the reactants, with or without a catalyst for the reaction, under conditions such that the olefin sulfide remains in the reaction mixture until reacted, e. g., in a sealed reaction vessel or under efficient reflux. The temperature of reaction, while dependent in part upon other reaction conditions, e. g., the nature of the anhydride and the type of sulfide used, longer or heavier substituted sulfides in general requiring higher temperatures, may vary although in general temperatures between 0° C. and 250° C, are chosen. The use of pyridine or other basic catalyst, preferably one soluble in the reaction mixture, is of advantage.

Certain of the simpler reactions involved are indicated below:

(a)
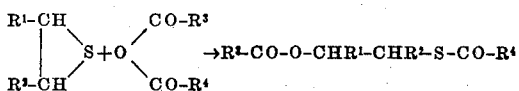

(b)
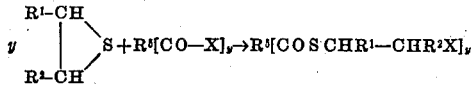

(c)
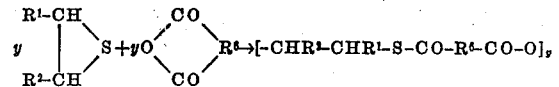

wherein $R^1$, $R^2$ are hydrogen or monovalent organic radicals preferably hydrocarbon and preferably aliphatic, $R^3$ and $R^4$ are the monovalent residues of an organic monocarboxylic acid, at least one of which is a monovalent organic radical, $R^5$ is an organic radical of valence $y$, $y$ being a positive integer and at least one, $R^6$ is a divalent organic radical, and X is a halogen.

The more detailed practice of the invention is illustrated by the following examples, wherein parts given are by weight and temperatures in degrees centigrade. There are of course many forms of the invention other than these specific embodiments.

EXAMPLE I

Acetate of acetyloxyethanthiol

To one hundred parts of ethylene sulfide contained in a reactor equipped with an efficient reflux condenser is added a solution of 12.6 parts of pyridine with 408 parts acetic anhydride. The reactor is heated on a steam bath for 18 hours, at the end of which time the contents are distilled. Four hundred and forty parts or 82% yield of the crude acetate of beta-acetyloxyethanthiol, $CH_3—CO—S—CH_2—CH_2—O—CO—CH_3$ is obtained based on the ethylene sulfide. The product purified by redistillation boils at 104–106° C. at 17 mm. A sample of the purified product prepared by this procedure gave an index of refraction of $$n_D^{23} 1.4707$$

Example II

*Acetate of beta-chloroethanthiol*

To 103 parts of ethylene sulfide contained in a reactor equipped with a mechanical stirrer and a reflux condenser is added 160 parts of acetyl chloride with stirring. Sufficient external cooling is applied to prevent escape of either the acetyl chloride or the ethylene sulfide. The reaction mixture is then transferred to a pressure reactor which is closed and maintained at room temperature for three days. The product is then distilled. A 75% yield of the acetate of beta-chloroethanthiol, $Cl-CH_2-CH_2-S-CO-CH_3$ boiling at 176-178° C. at atmospheric pressure is obtained. A sample of the purified product prepared by this procedure gave on analysis 23.10% sulfur as compared with a calculated value of 23.42% for $C_4H_7ClOS$. The index of refraction.

$$N_D^{23}$$

was found to be 1.4950.

Example III

*Polymeric reaction product of succinic anhydride and ethylene sulfide. Poly hydroxyethanethiol succinate*

To 9.67 parts succinic anhydride in a pressure reactor is added 5.80 parts ethylene sulfide and 0.2 part pyridine. The reactor is closed and heated at 130° for 10 hours. A homogeneous, dark colored, pitch-like, very tacky polymeric material is obtained from which no succinic anhydride is separable.

In the process of this invention any organic carboxylic acid interanhydride, i. e., any organic compound derivable from or hydrolysable, per mol of interanhydride, to a plurality of acid groups, at least one of which is a carboxyl group, may be employed, including simple and mixed organic acid anhydrides of monocarboxylic acids, and of polycarboxylic acids as well as the mixed anhydrides of organic carboxylic acids and hydrohalogen acids, e. g., acetic anhydride, caproic anhydride, palmitic anhydride, acetic caproic anhydride, acetic propionic anhydride, propionic anhydride, butyric anhydride, lauric anhydride, benzoic anhydride, naphthoic anhydride, phenylacetic anhydride, p-nitrobenzoic anhydride, acetyl chloride, propionyl chloride, palmityl chloride, butyryl chloride, lauryl chloride, stearyl chloride, crotonyl chloride, benzoyl chloride, naphthoyl chloride, the corresponding bromides, iodides and fluorides, phthalic anhydride, naphthalic anhydride, 3-nitrophthalic anhydride, phthalyl chloride, succinyl chloride, both symmetrical and unsymmetrical, terephthalyl chloride, isophthalyl chloride.

Any ethylene sulfide may be used including ethylene sulfide and the homologs and substituted derivatives of ethylene sulfide, such as propylene sulfide, the various butylene sulfides, hexene-3 sulfide, styrene sulfide, cyclohexene sulfide, etc. These have the generic formula

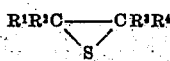

wherein $R^1$, $R^2$, $R^3$ and $R^4$ are hydrogen or hydrocarbon radicals. Thus in the case of cyclohexene sulfide, $R^1$ and $R^4$ are hydrogen and $R^2$ and $R^3$ together form the tetramethylene radical. The open chain ethylene sulfides are preferred, and of these, the ethylene sulfides containing not more than one substituent, and that hydrocarbon, on any one ethylene carbon are most useful.

While it has been found advantageous to carry these reactions out in the presence of a small amount of pyridrine at room temperature or at 100° C. in order to obtain good yields of the desired products, the process is not limited to the particular basic substance or to these temperatures, or to the time stated.

The reactions may be carried out at any temperature between 0° C. and 250° C. with or without a catalyst. As such there may be employed any basic substance inert to the acid anhydride, i. e., any substance inert to the acid anhydride and capable of adding to or combining with the hydrogen proton of an acid. Thus, there may be used any tertiary amine, e. g., pyridine, dimethylaniline, diethylbenzylamine, trimethylamine, dimethylaminoethanol, tripropylamine, dimethyllaurylamine.

The reaction may be conducted either in the presence or absence of neutral solvents or diluents, such as ether, dioxane, benzene, or in general, any neutral organic compound, liquid at the temperature used, and capable of dissolving the components of the reaction mixture, in either sealed vessels or in open vessels, providing proper precautions are taken to avoid loss of the reactants.

The products may be used as intermediates in the preparation of other useful chemicals, e. g., vinyl thiolacetate. The products prepared from olefin sulfides and acid chlorides are particularly useful as intermediates in the preparation of ethers and thioethers of beta-acyloxyethanethiols and of many other derivatives because of the reactivity of the chlorine atom in the products, e. g., the acetate of beta-chloroethanethiol.

This invention describes a novel and ready method for the preparation of the esters of beta-substituted ethanethiols. The reactions, under suitable conditions, proceed to give yields of 80% or better.

The above description and examples are intended to be illustrative only. Any modification of or variation therefrom which conforms to the spirit of the invention is intended to be included within the scope of the claims.

We claim:
1. Process of preparing esters which comprises reacting an alpha-alkylene sulfide with a member of the class consisting of halides and anhydrides of organic carboxylic acids.
2. Process of preparing esters which comprises reacting an alpha-alkylene sulfide with an anhydride of an organic carboxylic acid.
3. Process of preparing esters which comprises reacting an ethylene sulfide with an anhydride of an organic carboxylic acid.
4. Process of preparing esters which comprises reacting ethylene sulfide with an anhydride of an organic carboxylic acid.
5. Process of preparing esters which comprises reacting an ethylene sulfide with an anhydride of an organic monocarboxylic acid.
6. Process of preparing esters which comprises reacting ethylene sulfide with an anhydride of an organic monocarboxylic acid.
7. Process of preparing esters which comprises reacting an alpha-alkylene sulfide with a halide of an organic carboxylic acid.

8. Process of preparing esters which comprises reacting an alpha-alkylene sulfide with a halide of an organic monocarboxylic acid.

9. Process of preparing esters which comprises reacting an open chain alpha-alkylene sulfide with a halide of an organic monocarboxylic acid.

10. Process of preparing esters which comprises reacting ethylene sulfide with a halide of an organic monocarboxylic acid.

11. A monocarboxylic acid ester of a beta-halogen-alkanthiol.

12. A monocarboxylic acid ester of a beta-halogen-ethanthiol.

13. A monocarboxylic acid ester of beta-chloro-ethanthiol.

14. The acetate of beta-chloroethanthiol.

VAN VERNON ALDERMAN.
MERLIN MARTIN BRUBAKER.
WILLIAM EDWARD HANFORD.